(12) United States Patent
Sterling

(10) Patent No.: US 11,433,957 B2
(45) Date of Patent: Sep. 6, 2022

(54) UNITIZED DRIVE SYSTEM WITH INTEGRATED PLANETARY GEAR ASSEMBLY

(71) Applicant: Deere & Company, Moline, IL (US)

(72) Inventor: Andrew T. Sterling, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/916,388

(22) Filed: Jun. 30, 2020

(65) Prior Publication Data

US 2021/0403106 A1    Dec. 30, 2021

(51) Int. Cl.
*B62D 55/125* (2006.01)
*B60K 17/04* (2006.01)
*B62D 55/065* (2006.01)

(52) U.S. Cl.
CPC .......... *B62D 55/125* (2013.01); *B60K 17/046* (2013.01); *B62D 55/065* (2013.01)

(58) Field of Classification Search
CPC .. B62D 55/125; B62D 55/065; B60K 17/046; F16C 2229/00; F16C 2326/02; B60B 27/0005; B60B 27/001; B60B 2380/00–92
See application file for complete search history.

(56) References Cited

U.S. PATENT DOCUMENTS

| | | | | | |
|---|---|---|---|---|---|
| 1,317,103 | A | * | 9/1919 | Rimailho | B62D 55/125 180/9.62 |
| 1,482,113 | A | * | 1/1924 | Borst, Jr. | B62D 55/125 74/390 |
| 1,872,541 | A | * | 8/1932 | White | B62D 55/125 475/30 |
| 3,244,027 | A | * | 4/1966 | Layman | B62D 55/125 475/343 |
| 3,901,336 | A | * | 8/1975 | Bendure | B62D 55/125 180/9.62 |
| 3,951,481 | A | * | 4/1976 | Ritter, Jr. | B60B 27/04 384/563 |

(Continued)

OTHER PUBLICATIONS

German Search Report issued in German Patent Application No. 10 2021 113 781.0, dated Jan. 28, 2022, 8 pages.

*Primary Examiner* — Sherry L Estremsky
(74) *Attorney, Agent, or Firm* — Tucker Ellis LLP

(57) ABSTRACT

A drive system includes a main track frame adapted to be coupled with the associated tracked vehicle, a sprocket carrier, and a gear assembly operable to communicate rotational power from an associated input driving member to the sprocket carrier for driving the sprocket carrier relative to the main track frame. The main track frame includes an inboard support member, and an outboard member. The inboard and outboard support members are spaced apart relative to each other defining a gap therebetween. The sprocket carrier spans the gap and is rotatably carried by the inboard and outboard support members, and is adapted to couple with the associated sprocket of the associated tracked work vehicle. The gear assembly may be a planetary gear system. The planetary gear system may be disposed in the gap between the inboard and outboard support members. The planetary gear system may be disposed in the sprocket carrier.

21 Claims, 7 Drawing Sheets

(56) References Cited

U.S. PATENT DOCUMENTS

| | | | | |
|---|---|---|---|---|
| 4,029,166 A | * | 6/1977 | Haak | B62D 55/125 |
| | | | | 475/900 |
| 4,461,373 A | * | 7/1984 | Pratt | B60K 17/046 |
| | | | | 192/221.1 |
| 4,739,852 A | * | 4/1988 | Stevens | B62D 55/125 |
| | | | | 180/372 |
| 4,988,329 A | | 1/1991 | Lammers | |
| 4,997,344 A | * | 3/1991 | Nelson | F04B 1/0408 |
| | | | | 417/273 |
| 6,334,496 B1 | * | 1/2002 | Hiraki | B62D 55/02 |
| | | | | 180/9.5 |
| 6,655,482 B2 | | 12/2003 | Simmons | |
| 10,183,710 B2 | | 1/2019 | Zuidberg | |
| 2018/0118262 A1 | * | 5/2018 | Vik | B62D 55/065 |

* cited by examiner

UNITIZED DRIVE SYSTEM WITH INTEGRATED PLANETARY GEAR ASSEMBLY

FIELD OF THE DISCLOSURE

This disclosure relates to a drive system for a vehicle and, more particularly to a drive system including a planetary transmission for driving an associated sprocket coupled with a ground engaging traction member of a work vehicle. Although the embodiments will be described with reference to a drive system driving an associated sprocket of a tracked vehicle, it is to be appreciated that the claimed invention has broad application to a wide range of vehicles and in any other mechanisms where drives systems are used.

BACKGROUND

In various applications, a drive system may be utilized to provide rotational power to various drivetrain components of a vehicle. In tracked work vehicles, for example, a final drive system may be mounted to a frame of the vehicle in order to provide rotational power at output hubs of the drive system to drive continuous loop tracks of the vehicle from the hubs and thereby move the vehicle over terrain. Such drive systems may include, in addition to the final drive system, one or more motors for providing prime mover rotational power, and various gears for adjusting the speed and/or torque of the rotational power for output at the output hubs to the tracks.

Known designs of drive systems may require significant amounts of space and material to provide a power-transmitting attachment between a gear set and an output hub, typically a sprocket intermatable with a continuous loop track of the vehicle. In many cases, the significant amount of space required by these known designs impacts the overall width of the vehicle by causing it to need to be increased because the set of drive tracks need to be set further apart in order to accommodate the drive system therebetween. Further, known designs may sometimes require relative expensive manufacturing techniques in order to mount rotating parts of the drive system relative to stationary and/or other rotating parts of the drive system.

Accordingly, it is desirable to provide a drive device that is smaller and weighs less than drive systems that have previously been available.

It is further desirable to provide a drive system that is easier and less expensive to manufacture than drive systems that have previously been available.

SUMMARY

A drive system is provided that is compact, lightweight, rugged, and easy to manufacture. Its compact size permits, among other things, the vehicle into which the drive is received to be narrower than in previous drive systems because the tracks need not be spaced apart as far as was previously required.

In accordance with an aspect of the example, the drive system includes a main track frame adapted to be coupled with the associated tracked vehicle, a sprocket carrier, and a gear assembly operable to communicate rotational power from an associated input driving member to the sprocket carrier for driving the sprocket carrier relative to the main track frame. The main track frame includes an inboard support member, and an outboard member. The inboard and outboard support members are spaced apart relative to each other defining a gap therebetween. The sprocket carrier spans the gap and is rotatably carried by the inboard and outboard support members, and is adapted to couple with the associated sprocket of the associated tracked work vehicle.

In accordance with an aspect of the example, the gear assembly may be a planetary gear system. The planetary gear system may include a sun gear operatively coupled with the associated input driving member, a ring gear operatively coupled with the inboard support member of the main track frame, a plurality of planetary gears in operative engagement with the sun and ring gears, and a planetary gear carrier carrying the plurality of planetary gears relative to the sun and ring gears. The planetary gear carrier is operatively coupled with the sprocket carrier for driving the sprocket carrier relative to the main track frame responsive to the rotational power from an associated input driving member communicated to the sun gear.

In accordance with an aspect of the example, the planetary gear system of the drive system may be disposed in the gap between the inboard and outboard support members.

In accordance with an aspect of the example, the planetary gear system of the drive system may be disposed in the sprocket carrier.

BRIEF DESCRIPTION OF THE DRAWINGS

In the accompanying drawings which are incorporated in and constitute a part of the specification, example embodiments of the invention are illustrated, which, together with a general description of the invention given above, and the detailed description given below, serve to exemplify the example embodiments of the claimed invention.

DETAILED DESCRIPTION

Figure 1:
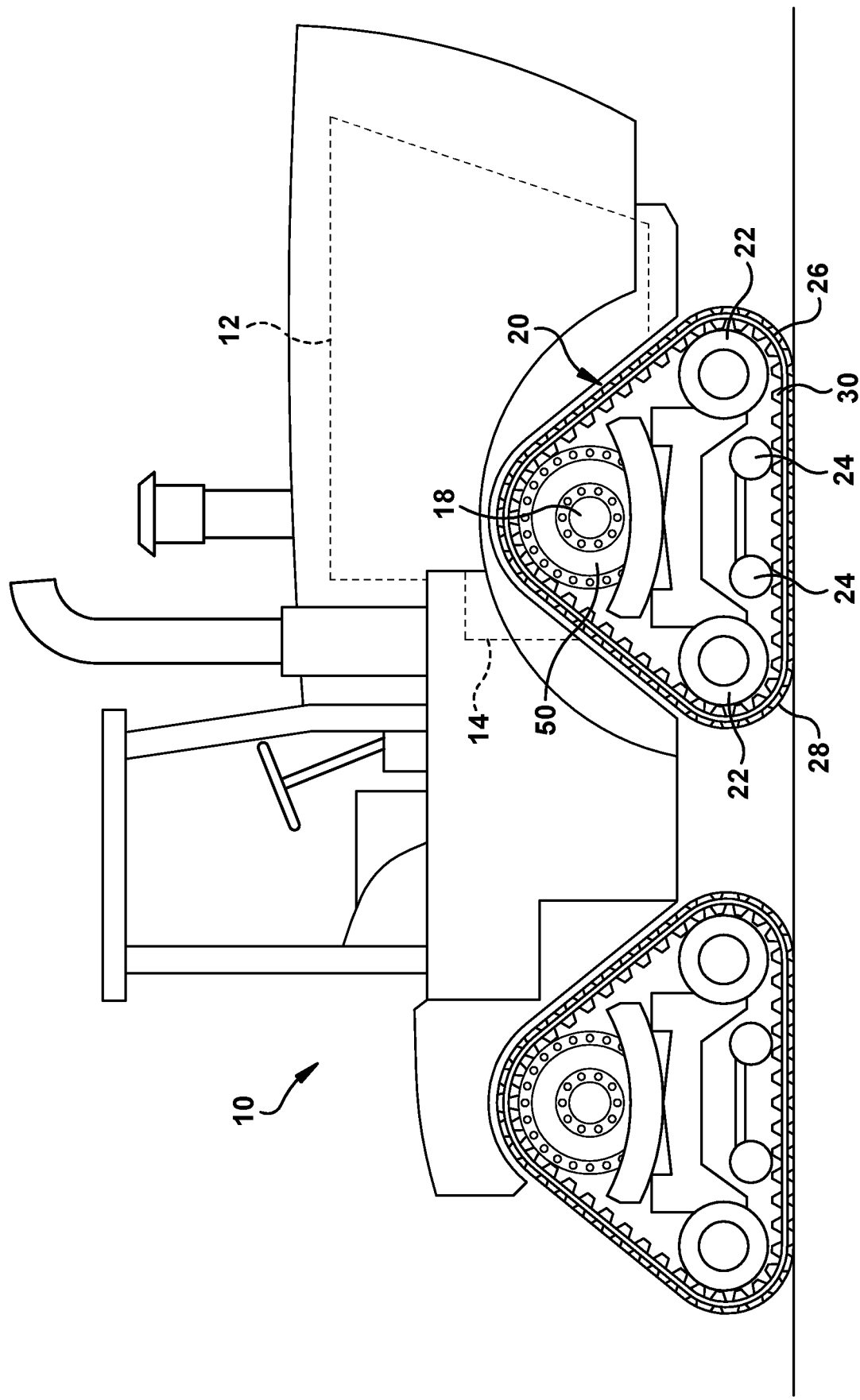
FIG. 1 is a side view of an exemplary vehicle in which the disclosed drive system may be implemented.

The following describes one or more example embodiments of the disclosed drive assembly, as shown in the accompanying figures of the drawings described briefly above. Various modifications to the example embodiments may be contemplated by one of skill in the art.

As used herein, the "axial" direction may refer to a direction that is generally parallel to an axis of rotation, axis of symmetry, or centerline of a component or components. For example, in a cylinder with a centerline and opposite, circular ends, the "axial" direction may refer to the direction that generally extends in parallel to the centerline between the opposite ends. In certain instances, the term "axial" may be utilized with respect to components that are not cylindrical (or otherwise radially symmetric). For example, the "axial" direction for a rectangular housing containing a rotating shaft may be viewed as a direction that is generally in parallel with the rotational axis of the shaft.

Also as used herein, "radially" aligned may refer to two components that are both disposed along a line extending perpendicularly outward from a shared center line, axis, or similar reference. For example, two concentric and axially overlapping cylindrical components may be viewed as "radially" aligned over the portions of the components that axially overlap, but not "radially" aligned over the portions of the components that do not axially overlap. In certain instances, components may be viewed as "radially" aligned although one or both of the components may not be cylindrical (or otherwise radially symmetric). For example, a rotating shaft may be "radially" aligned with a rectangular housing containing the shaft over a length of the shaft that axially overlaps with the housing.

As also noted above, known designs for drive assemblies may exhibit various characteristics that result in relatively large manufacturing costs for the drive assemblies. For example, a prior art drive assembly (not shown) may include a planetary gear system having a planetary gear carrier that is fixed to inner and outer support members and that is, therefore non-rotating. A portion of the planetary gear carrier is used as a surface for supporting an outer sprocket drive member for driving tracks of a work vehicle.

The configuration of such a drive assembly (and similar configurations) may introduce various costs to manufacturing. For example, a relatively large quantity of the material may be required for the planetary gear carrier to be used as a support surface for the sprocket to drive tracks of the work vehicle. This may impose the need for added material in the drive system adding to its size and weight. In addition, drive systems of this nature require that the bearings are set up after many of the components of the drive system are installed onto the target work vehicle. This may impose relatively significant costs on the manufacture of the drive assembly. As another example, a spacer may be required in order to hold the ring gear in place within the housing. The spacer may also impose relatively significant material costs on the manufacture of the drive assembly.

Aside from the amount of material required for such a housing (and in similar configurations), the expected loads and stresses on the housing may generally require the use of relatively expensive materials and manufacturing techniques for the formation of the housing (and related components).

Other issues may arise beyond material costs. For example, due to the configuration of such a housing, and the location of the ring gear, the housing may require relatively precise machining in order to ensure an appropriate fit with the ring gear. Further, it may be necessary to form the teeth of the ring gear by way of relatively expensive and time-consuming manufacturing methods, such as individual shaper cuts. The drive assembly disclosed and claimed herein beneficially addresses the issues noted above, as well as providing various additional and other benefits.

The disclosed drive system may be utilized with an example vehicle 10, as shown in FIG. 1. As shown, the vehicle 10 is depicted as an articulated four-track tractor with power source 12 (e.g., an internal combustion engine) and drive train 14. Vehicle 10 may have four track drives, each having a drive sprocket 50, rotating about an axle 18 and providing motive power to endless track 20 to propel vehicle 10 on the ground. Drive sprocket 50 and axle 18 are driven by drive train 14 such that drive train 14 transmits motive power from the power source 12. Endless track 20 also engages idler wheels 22 and bogie wheels 24 of the track drives. Bogie wheels 24 can also be referred to as mid-rollers. It will be understood that other configurations may be possible. For example, there may be two tracks instead of four or there may be a combination of ground engaging wheels, tandems, and/or tracks. The drive train 14 may also include electric generators and/or drives for providing motive power to the track drives.

The drive train 14 may comprise a hydraulic pump driven by the power source 12 that in turn drives a hydraulic motor that drives the drive sprockets 50. Alternatively, drive train 14 may comprise an electric generator driven by the power source 12 that in turn drives an electric motor that drives the drive sprockets 50.

Endless track 20 may be, for example, an endless track having an elastomeric body 26, an outer side 28 displaying a series of ground engaging profiles and an inner side 30 displaying a series of drive lugs adapted to be engaged by drive sprockets on drive sprocket 50 of vehicle 10. In view of its underlying nature, the elastomeric body 26 can be referred to as a "carcass." The elastomeric body 26 is elastomeric in that it comprises elastomeric material. The elastomeric material can be any polymeric material with the property of elasticity. In this case, the elastomeric material of the elastomeric body 26 includes rubber. Various rubber compounds may be used and, in some cases, different rubber compounds may be present in different areas of the elastomeric body 26. In other cases, the elastomeric material of the elastomeric body 26 may include another elastomer in addition to or instead of rubber (e.g., polyurethane elastomer). The elastomeric body 26 can comprise one or more reinforcements embedded in its elastomeric material. For example, one such reinforcement may be a layer of reinforcing cables (e.g., cords or wire ropes) that extend generally in the longitudinal direction of the endless track 20 to enhance its strength in tension along its longitudinal direction. Another example of a reinforcing member is a layer of reinforcing fabric that comprises pliable material made usually by weaving, felting, or knitting natural or synthetic fibers (e.g., a ply of reinforcing woven fibers).

The ground engaging profiles comprise a plurality of traction projections (sometimes referred to as "traction lugs", "drive treads," "tread members" or "tread bars") distributed on the ground-engaging outer side 28. Each of the traction projections can have an elongated shape and can be angled relative to the longitudinal direction of the endless track 20. The traction projections of the ground engaging profiles may have various other shapes in other examples (e.g., curved shapes, shapes with straight parts and curved parts, etc.). Ground engaging profiles can comprise elastomeric material. The elastomeric material of the ground engaging profiles can be any polymeric material with suitable elasticity, such as rubber. Various rubber compounds may be used and, in some cases, different rubber compounds may be present in different areas of the ground engaging profiles. In other embodiments, the elastomeric material of at least some of the ground engaging profiles may include another elastomer in addition to or instead of rubber.

The inner side 30 of the endless track 20 contacts the drive sprocket 50 in order to cause motion of the endless track 20 around the idler wheels 22 and bogie wheels 24. The idler wheels 22 and/or bogies can help support part of the weight of the vehicle 10 on the ground via the endless track 20, guide the endless track 20 as it is driven by the drive sprocket 50, and/or tension the endless track 20. Drive lugs extend inwardly from the inner side 30 of endless track 20 and engage the drive sprocket 50. Drive lugs also help to guide the endless track 20 as it is driven by drive sprocket 50 to help prevent undesired lateral movement or detracking of endless track 20. Drive lugs can interact with idler wheels 22 to guide the endless track 20. Drive lugs can be considered to be drive or guide projections in that they help with the driving and the guiding of endless track 20. Drive lugs can each comprise elastomeric material. The elastomeric material of the drive lugs can be any polymeric material with suitable elasticity, such as rubber. Various rubber compounds may be used and, in some cases, different rubber compounds may be present in different areas of the drive lugs. In other embodiments, the elastomeric material of at least some of the drive lugs may include another elastomer in addition to or instead of rubber.

Additionally, the inner side 30 of endless track 20 can be also frictionally driven by drive sprocket 50 such that friction between inner side 30 and drive sprocket 50 helps to cause motion of the endless track 20. In some embodiments, endless track 20 may not include drive lugs, or may include smaller guide lugs, and the endless track 20 may be driven mostly via friction with the drive sprocket 50.

The drive sprocket 50 rotates when the axle 18 rotates when being driven by drive train 14. Rotation of the drive sprocket 50 rotates the endless track 20 and causes vehicle 10 to be propelled on the ground.

Figure 2:
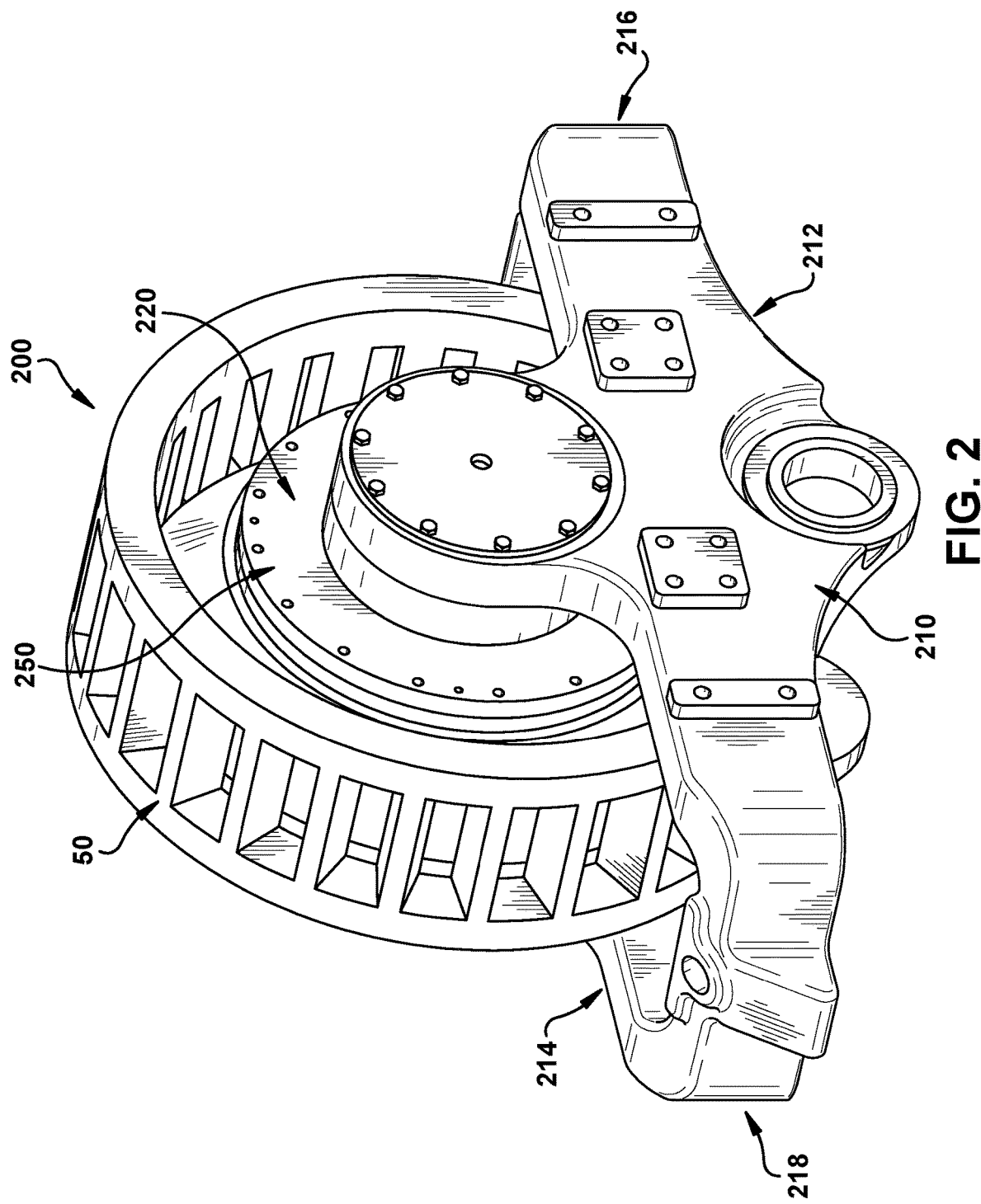
FIG. 2 is a perspective view showing an outer side of a drive system in accordance with an example embodiment.
Figure 3:
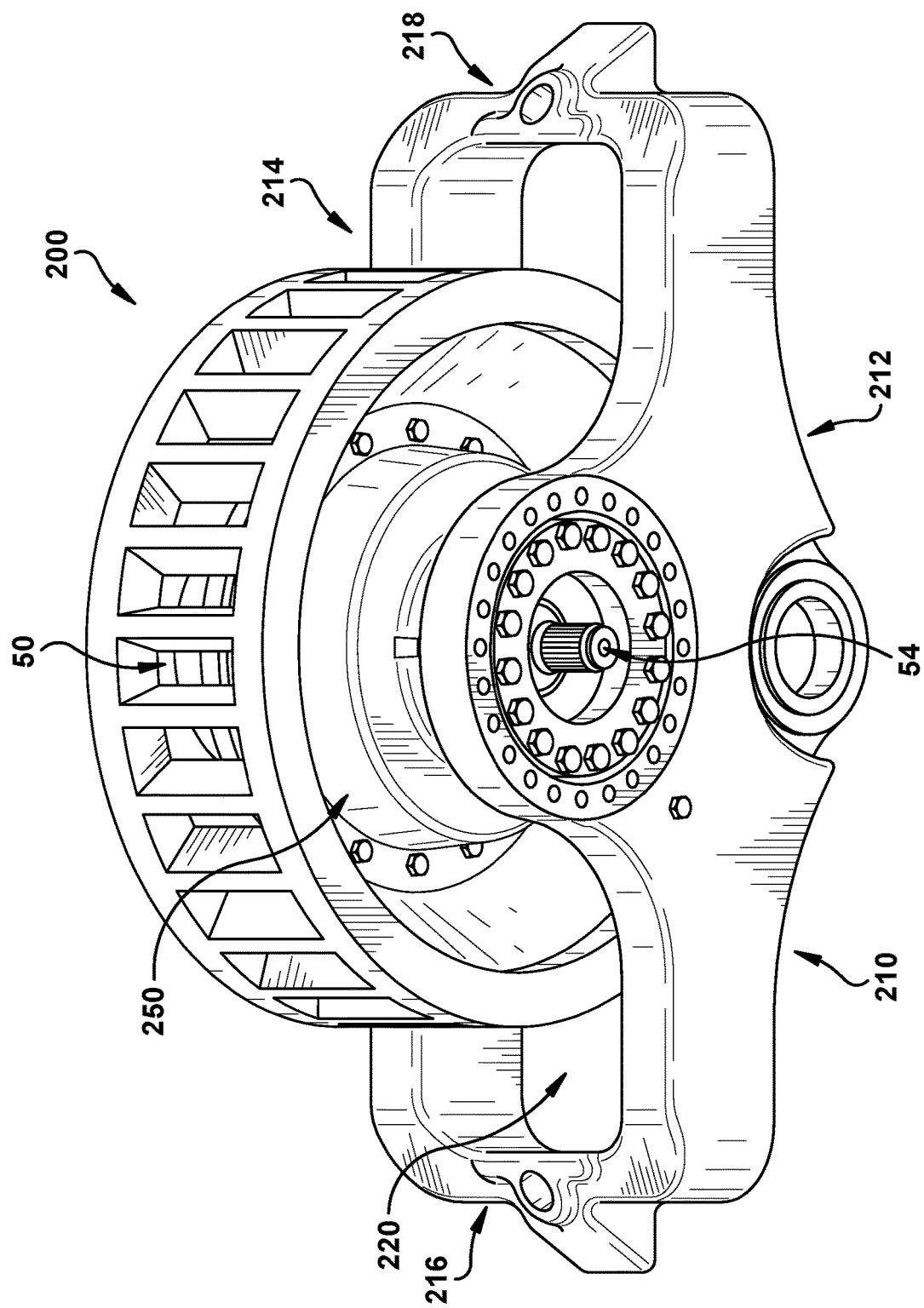
FIG. 3 is a perspective view showing an inner side of the drive system of FIG. 2 in accordance with an example embodiment.
Figure 4:
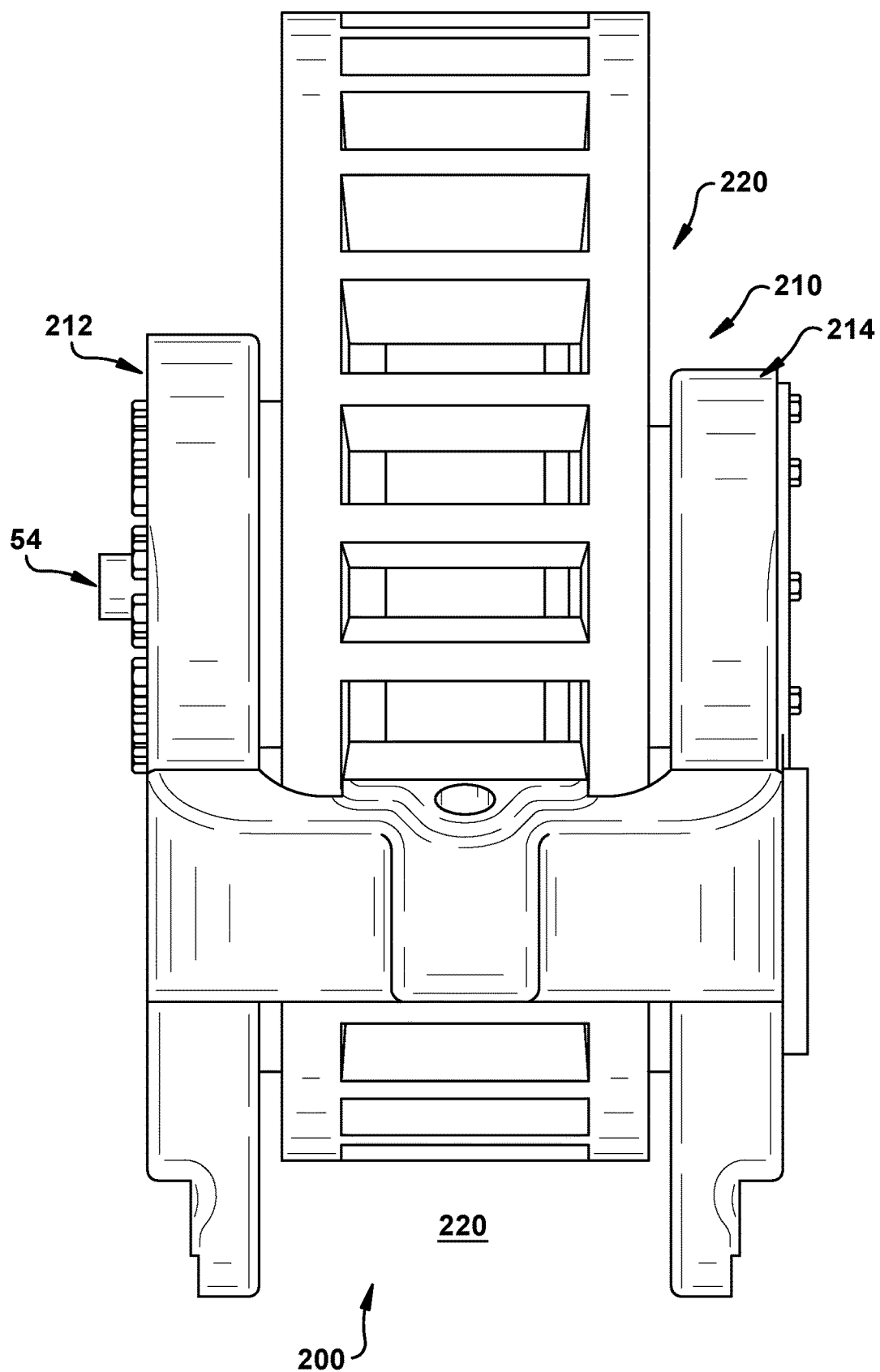
FIG. 4 is an end elevational view of the drive system of FIG. 2 in accordance with an example embodiment.
Figure 5:
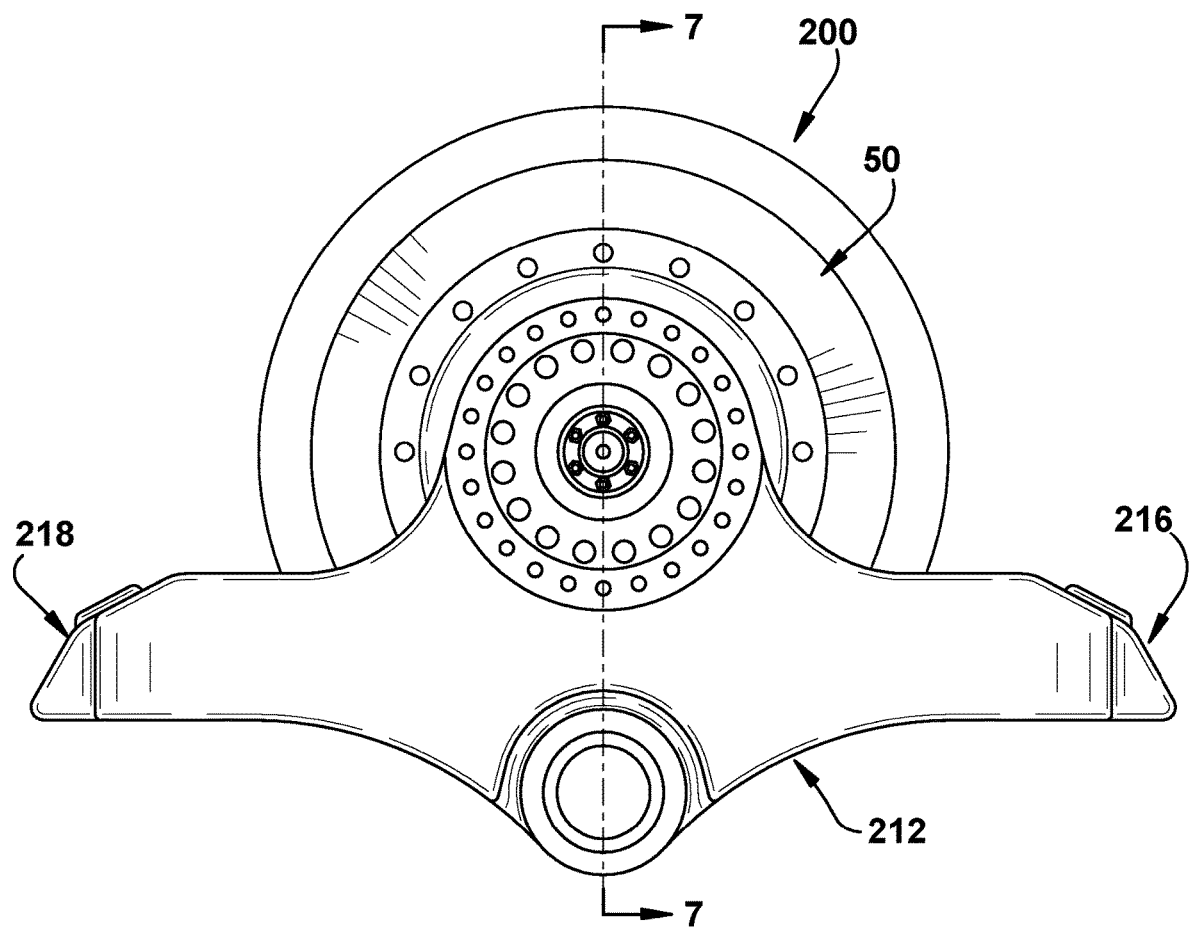
FIG. 5 is a side elevational view of the drive system of FIG. 2 in accordance with an example embodiment.

FIG. 2 is a perspective view showing an outer side of a drive system 200 relative to the associated work vehicle (not shown) in accordance with an example embodiment, FIG. 3 is a perspective view showing an inner side of the drive system 200 relative to the associated work vehicle (not shown), FIG. 4 is an end elevational view of the drive system 200, and FIG. 5 is a side elevational view of the drive system 200. With reference now to those Figures, the drive system 200 of the example embodiment includes a main track frame 210 adapted to be coupled with the associated work vehicle 10, and a gear assembly 600 (FIG. 6) to be described in greater detail below.

In the example embodiment, the main track frame 210 of the drive system 200 has a generally rectangular conformation defined by an inboard support member 212, an outboard support member 214, a forward support member 216, and a rear support member 218. As best seen in FIG. 3, the inboard and outboard support members 212, 214 are spaced apart relative to each other thereby defining a gap 220 therebetween. The Figures show that in accordance with the example embodiment, a sprocket carrier 250 is disposed in the gap 220 defined by the main track frame 200. As will be further described below, the gear assembly 600 (FIGS. 6 and 7) is also disposed in the gap 220 in accordance with the example embodiment. The gear assembly 600 may be a planetary gear system 601 disposed in the sprocket carrier 250. Numerous benefits are derived from these arrangements, the components, and the arrangements of the components of the example embodiment. One benefit is that the drive system of the example embodiment is more compact in size than drive systems previously available. The significant reduction in the amount of space required by the drive system described and claimed herein advantageously impacts the overall width of the vehicle by allowing it to be decreased as necessary or desired, because the set of drive tracks may be set closed together since the smaller size of the drive system can be more easily accommodated between the drive tracks.

In addition to the above, a further benefit of this arrangement of components of the drive system 200 of the example embodiment is that the drive system 200 may be pre-assembled including setting bearing pre-loads and the like for example, stored in inventory and may be desired, and for as long as needed, and/or shipped to a manufacturing or other facility, and then delivered at an assembly point in the manufacture of the work vehicle that is most convenient and efficient, thereby saving time and costs. This feature is best is shown, for example, in FIGS. 2-5, and 7. The drive system 200 of the example embodiment may be easily attached to the associated work vehicle as an integrated assembly in a simple bolt-on assembly step or the like.

Yet a further benefit of this arrangement of components of the drive system 200 of the example embodiment is that it provides superior load support while also minimizing torsional moments that are typically generated in drive systems that were previously available. As shown for example in the end elevational view of the drive system 200 in FIG. 4, the sprocket carrier 250 carrying the associated sprocket 50 is disposed in the gap 220 defined between the inboard and outboard support members 212, 214. In an example embodiment, the sprocket carrier 250 carrying the associated sprocket 50 is disposed substantially midway in the gap 220 defined between the inboard and outboard support members 212, 214 and, in a further example embodiment, the sprocket carrier 250 carrying the associated sprocket 50 is disposed exactly midway in the gap 220 defined between the inboard and outboard support members 212, 214. As will be further described in greater detail, the sprocket carrier 250 is rotatably carried by suitable bearings, bushings, or the like. The sprocket carrier 250 spanning the gap 220 in this way permits radial loading of the associated sprocket through the sprocket carrier 250 during vehicle operation to be evenly shared by the inboard and outboard support members 212, 214. In that way the size, cost and weight of the main track frame 200 of the drive system 200 may be minimized thereby optimizing its size, weight, and cost.

The sprocket carrier 250 spanning the gap 220 in this way also permits the radial loading of the associated sprocket during vehicle operation to be evenly distributed through the sprocket carrier 250 itself. Were the sprocket carrier 250 to not span the inboard and outboard support members 212, 214 and not be substantially centered between the inboard and outboard support members 212, 214 in a manner as illustrated, one end or the other of the sprocket carrier 250 would need to be up-sized to provide strength and ruggedness, etc. accordingly, thereby adding to the overall size, weight and cost of the subject drive system. Rather, in accordance with the example embodiment, the sprocket carrier 250 is substantially centered between the inboard and outboard support members 212, 214 in a manner as illustrated, wherein neither end of the sprocket carrier 250 needs to up-sized for providing strength, ruggedness, etc. and, accordingly, the overall size, weight and cost of the subject drive system 200 is minimized.

Figure 6:
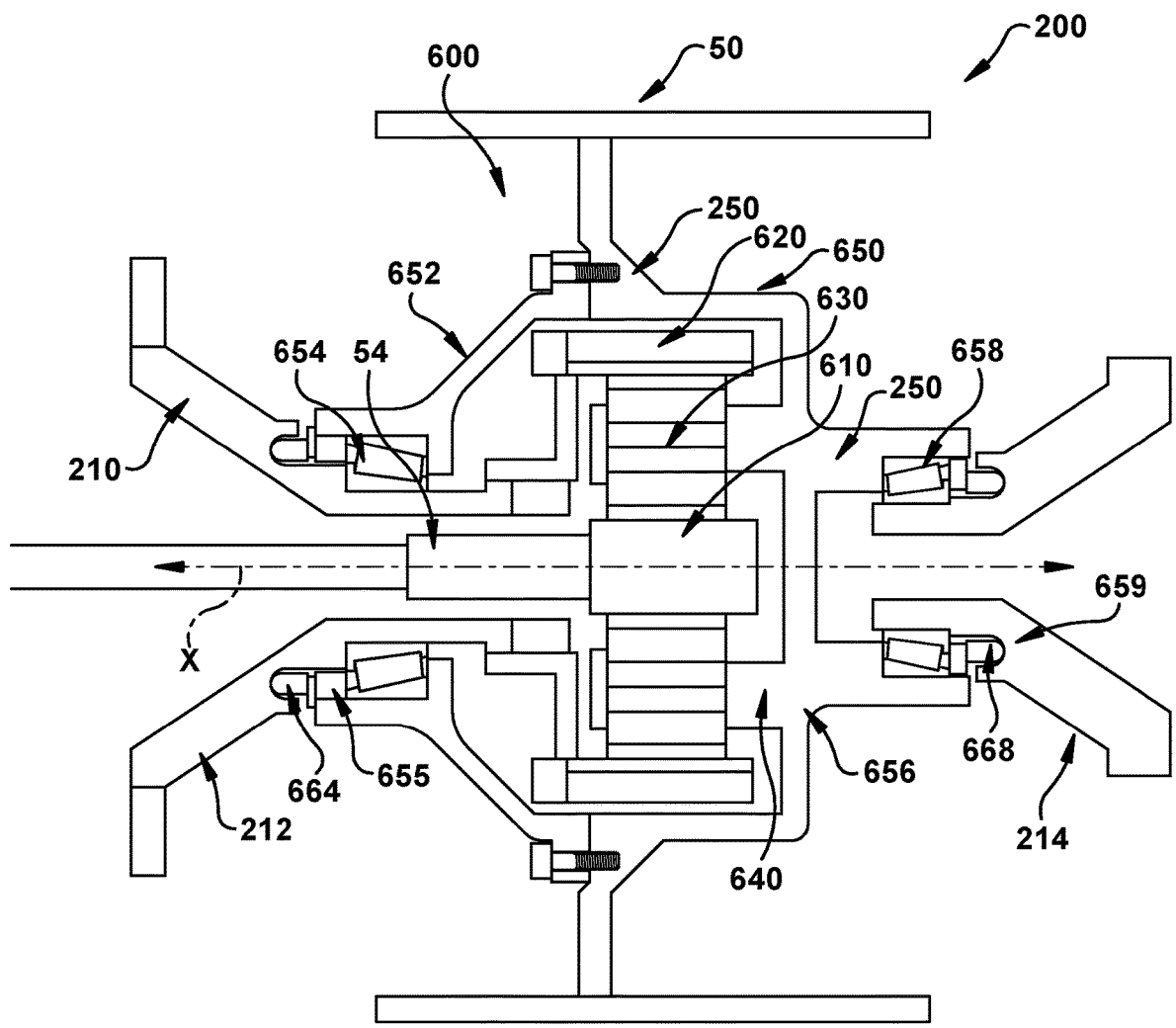
FIG. 6 is a simplified schematic view of the drive system of FIG. 2 in accordance with an example embodiment.
Figure 7:
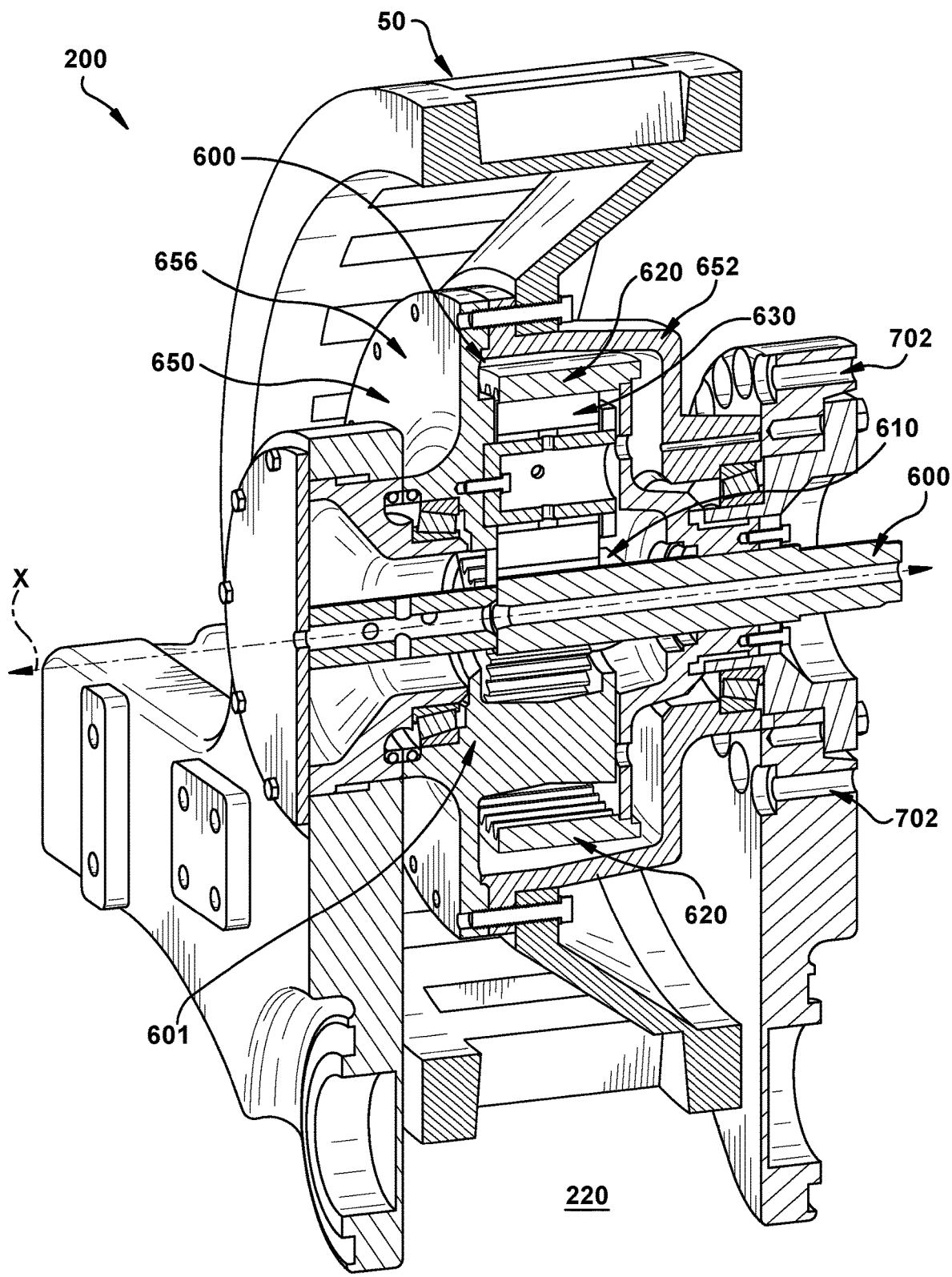
FIG. 7 is a cross-section view of the drive system of FIG. 2 taken along line 7-7 of FIG. 5 in accordance with an example embodiment.

FIG. 6 is a simplified schematic view of the drive system 200 of FIG. 2, and FIG. 7 is a cross-sectional view of the drive system of FIG. 2 taken along line 7-7 of FIG. 5 in accordance with an example embodiment. As shown in those illustrations, the drive system 200 includes a main track frame 210 adapted to be coupled with the associated tracked vehicle 10, a sprocket carrier 250, and a gear assembly 600 operable to communicate rotational power from an associated input driving member 54 to the sprocket carrier 250 for driving the sprocket carrier 250 relative to the main track frame 210. In the example embodiment, the main track frame 210 includes an inboard support member 212 and an outboard support member 214, wherein the inboard and outboard support members 212, 214 are spaced apart relative to each other defining a gap 220 therebetween. As illustrated, the sprocket carrier 250 spans the gap 220 and is rotatably carried by the inboard and outboard support members 212, 214. The sprocket carrier 250 of the example embodiment is adapted to couple with the associated sprocket 50 of the associated tracked work vehicle 10.

In its preferred form, the gear assembly 600 of the drive system 200 is a planetary gear system 601 having a sun gear 610 operatively coupled with the associated input driving member 54, a ring gear 620 operatively coupled with the inboard support member 212 of the main track frame 210, a plurality of planetary gears 630 in operative engagement with the sun and ring gears 610, 620, and a planetary gear carrier 640 carrying the plurality of planetary gears 630 relative to the sun and ring gears 610, 620.

In the example embodiment illustrated, the planetary gear carrier 640 is operatively coupled with the sprocket carrier 250 for driving the sprocket carrier 250 relative to the main track frame 210 responsive to the rotational power from an associated input driving member 54 communicated to the sun gear 610. The sprocket carrier 250 of the drive system 200 is rotatable relative to the main track frame 210 about a rotation axis X.

As shown, the planetary gear system 601 of the drive system 200 is disposed in the gap 220 defined between the inboard and outboard members 212, 214 of the main track frame 210. The gear assembly 600 may be a planetary gear system 601 disposed in the sprocket carrier 250.

In one form, the sprocket carrier 250 may be formed as a single piece construction such as for example as a single casting member or the like. An inboard bearing assembly 654 is disposed between the inboard support member 212 of the main track frame 210 and the sprocket carrier 250, and an outboard bearing assembly 658 is disposed between the outboard support member 214 of the main track frame 210 and the sprocket carrier 250. In that way, the inboard and outboard bearing assemblies 654, 658 rotatably couple the sprocket carrier 250 directly with the main track frame 210. As described above, a benefit of the overall arrangement of components of the drive system 200 of the example embodiment is that it provides superior load support while also minimizing torsional moments that are typically generated in drive systems that were previously available. The sprocket carrier 250 is rotatably carried by suitable bearings, bushings, or the like directly coupled with the main track frame 210. The sprocket carrier 250 spanning the gap 220 and directly connected with the main track frame 210 in this way permits radial loading of the associated sprocket through the sprocket carrier 250 during vehicle operation to be evenly shared by the inboard and outboard support members 212, 214. In that way the size, cost and weight of the main track frame 200 of the drive system 200 may be minimized thereby optimizing its size, weight, and cost.

The sprocket carrier 250 spanning the gap 220 and directly connected with the main track frame 210 in this way also permits the radial loading of the associated sprocket during vehicle operation to be evenly distributed through the sprocket carrier 250 itself. Were the sprocket carrier 250 to not span the inboard and outboard support members 212, 214 and not be substantially centered between the inboard and outboard support members 212, 214 and directly connected with the main track frame 210 in a manner as illustrated, one end or the other of the sprocket carrier 250 would need to be up-sized to provide strength and ruggedness, etc. accordingly, thereby adding to the overall size, weight and cost of the subject drive system. Rather, in accordance with the example embodiment, the sprocket carrier 250 is substantially centered between the inboard and outboard support members 212, 214 in a manner as illustrated and directly connected with the main track frame 210, wherein neither end of the sprocket carrier 250 needs to up-sized for providing strength, ruggedness, etc. and, accordingly, the overall size, weight and cost of the subject drive system 200 is minimized.

In the example embodiment illustrated, the sprocket carrier 250 is formed or otherwise provided in particular as a split carrier member 650. The split carrier member 650 of the example embodiment includes an inner sprocket support member 652 rotatably carried by the inner bearing assembly 654 on the inboard support member 212, and an outer sprocket support member 656 rotatably carried by the outer bearing assembly 658 on the outer support member 214. The inner and outer sprocket support members 652, 656 may be fastened together using suitable fasteners or the like.

In the example embodiment illustrated, the inboard bearing assembly 654 includes an inboard quill assembly 655, and the outboard bearing assembly 658 includes an outboard quill assembly 659. The inboard quill assembly 655 is operative to set a nominal axial preload along the rotation axis X between the inner and outer bearing assemblies 654, 658, and the outboard quill assembly 659 is operative to set, together with the nominal axial preload, a final working axial preload along the rotation axis X between the inner and outer bearing assemblies 654, 658.

In the example embodiment illustrated, the inboard bearing assembly 654 includes an inboard seal member 664 preventing fluid flow between the inboard support member 212 of the main track frame 210 and the sprocket carrier 250. In addition, the outboard bearing assembly 658 includes an outboard seal member 668 preventing fluid flow between the outboard support member 214 of the main track frame 210 and the sprocket carrier 250.

The associated vehicle 10 is a work vehicle in the form of a tractor with ground-engaging tracks 32. The drive system 200 of the example embodiment is configured as a final drive assembly that is mounted to a frame 36 of the vehicle 30 in order to provide motive power to the tracks 32. In this regard, a set of mounting holes 702 (FIG. 7) are provided in the inboard support member 212 so that the drive system 200 may be easily installed onto the vehicle during manufacture. The drive system 200 may be pre-assembled such as for example as shown in FIG. 7 including setting bearing pre-loads and the like for example, stored in inventory and may be desired, and for as long as needed, and/or shipped to a manufacturing or other facility, and then delivered at an assembly point in the manufacture of the work vehicle that is most convenient and efficient, thereby saving time and costs. The drive system 200 of the example embodiment may be easily attached to the associated work vehicle as an integrated assembly using one or more fastening means such as for example the set of mounting holes 702 in a simple bolt-on assembly step or the like.

In accordance to the above, therefore, a drive system for driving an associated sprocket of an associated tracked work vehicle in accordance with a first example includes a main track frame adapted to be coupled with the associated tracked vehicle, a sprocket carrier in a gap defined by inboard and outboard support members of the main track frame, and a gear assembly operable to communicate rotational power from an associated input driving member to the sprocket carrier for driving the sprocket carrier relative to the main track frame. The main track frame of the drive system includes the inboard support member, and the outboard member, wherein the inboard and outboard support members are spaced apart relative to each other defining the gap therebetween. The sprocket carrier is adapted to couple with the associated sprocket of the associated tracked work vehicle. The sprocket carrier may span the gap between the inboard and outboard support members.

A second example drive system may include the features of the first example drive system, wherein the gear assembly comprises a planetary gear system comprising: a sun gear operatively coupled with the associated input driving member, a ring gear operatively coupled with the inboard support member of the main track frame, a plurality of planetary gears in operative engagement with the sun and ring gears, and a planetary gear carrier carrying the plurality of planetary gears relative to the sun and ring gears, wherein the planetary gear carrier is operatively coupled with the sprocket carrier for driving the sprocket carrier relative to the main track frame responsive to the rotational power from an associated input driving member communicated to the sun gear.

A third example drive system may include the features of the first or second example drive systems, wherein the planetary gear system is disposed in the gap.

A fourth example drive system may include the features of any of the first through third example drive systems, wherein the planetary gear system is disposed in the sprocket carrier.

A fifth example drive system may include the features of any of the first through fourth example drive systems, wherein the sprocket carrier comprises a split carrier member comprising: an inner sprocket support member rotatably carried by an inner bearing on the inboard support member, and an outer sprocket support member rotatably carried by an outer bearing on the outer support member.

A sixth example drive system may include the features of any of the first through fifth example drive systems, wherein the sprocket carrier is integrally formed with the associated sprocket of the associated tracked work vehicle.

A seventh example drive system may include the features of any of the first through sixth example drive systems, and further comprising an inboard bearing assembly disposed between the inboard support member of the main track frame and the sprocket carrier, and an outboard bearing assembly disposed between the outboard support member of the main track frame and the sprocket carrier, wherein the inboard and outboard bearing assemblies rotatably couple the sprocket carrier directly with the main track frame.

An eight example drive system may include the features of any of the first through seventh example drive systems, wherein the sprocket carrier is rotatable relative to the main track frame about a rotation axis X, the inboard bearing assembly comprises an inboard quill assembly, and the outboard bearing assembly comprises an outboard quill assembly, wherein the inboard quill assembly is operative to set a nominal axial preload along the rotation axis X between the inner and outer bearing assemblies, and wherein the outboard quill assembly is operative to set, together with the nominal axial preload, a final working axial preload along the rotation axis X between the inner and outer bearing assemblies.

A ninth example drive system may include the features of any of the first through eight example drive systems, wherein the inboard bearing assembly comprises an inboard seal member preventing fluid flow between the inboard support member of the main track frame and the sprocket carrier, and the outboard bearing assembly comprises an outboard seal member preventing fluid flow between the outboard support member of the main track frame and the sprocket carrier.

It will be understood that the depicted vehicle 10 is presented as an example only, and that the disclosed drive assembly (e.g., the drive system 200) may be utilized with other vehicles (or other machines). Further, it will be understood that the disclosed drive assembly may be utilized as a final drive assembly (e.g., as depicted for the drive system 200) for providing motive power to a ground-engaging element (e.g., wheels, etc.) of a vehicle, or may be utilized to provide rotational power to other types of devices.

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

The invention claimed is:

1. A unitized drive system for driving an associated sprocket of an associated tracked work vehicle, the unitized drive system comprising:
   a sprocket carrier;
   a gear assembly;
   a main track frame adapted to be coupled onto the associated tracked vehicle as an integrated assembly together with the sprocket carrier and the gear assembly, the main track frame comprising:
      an inboard support member; and
      an outboard support member, wherein the inboard and outboard support members are spaced apart relative to each other defining a gap therebetween;
   an inboard bearing assembly comprising an inboard quill, the inboard bearing assembly being disposed between the inboard support member of the main track frame and the sprocket carrier; and
   an outboard bearing assembly comprising an outboard quill, the outboard bearing assembly being disposed between the outboard support member of the main track frame and the sprocket carrier,
   wherein the sprocket carrier spans the gap and is carried rotatably about a rotation axis X by the inboard and outboard bearing assemblies relative to the inboard and outboard support members, the sprocket carrier being adapted to couple with the associated sprocket of the associated tracked work vehicle,
   wherein the gear assembly is carried rotatably relative to the main track frame, the gear assembly being operable to communicate rotational power from an associated input driving member to the sprocket carrier for driving the sprocket carrier relative to the main track frame,
   wherein the inboard quill is operative to set a nominal axial preload along the rotation axis X between the inboard and outboard bearing assemblies, and wherein the outboard quill is operative to set, together with the nominal axial preload, a final working axial preload along the rotation axis X between the inboard and outboard bearing assemblies.

2. The unitized drive system according to claim 1, wherein:
the gear assembly comprises a planetary gear system comprising:
a sun gear operatively coupled with the associated input driving member;
a ring gear operatively coupled with the inboard support member of the main track frame;
a plurality of planetary gears in operative engagement with the sun and ring gears; and
a planetary gear carrier carrying the plurality of planetary gears relative to the sun and ring gears,
wherein the planetary gear carrier is operatively coupled with the sprocket carrier for driving the sprocket carrier relative to the main track frame responsive to the rotational power from the associated input driving member communicated to the sun gear.

3. The unitized drive system according to claim 2, wherein:
the planetary gear system is disposed in the gap.

4. The unitized drive system according to claim 2, wherein:
the planetary gear system is disposed in the sprocket carrier.

5. The unitized drive system according to claim 1, wherein:
the sprocket carrier comprises a split carrier member comprising:
an inner sprocket support member rotatably carried relative to the inboard support member by the inboard bearing assembly; and
an outer sprocket support member rotatably carried relative to the outboard support member by the outboard bearing assembly.

6. The unitized drive system according to claim 1, wherein:
the sprocket carrier is integrally formed with the associated sprocket of the associated tracked work vehicle.

7. The unitized drive system according to claim 1, wherein:
the inboard bearing assembly comprises an inboard seal member preventing fluid flow between the inboard support member of the main track frame and the sprocket carrier; and
the outboard bearing assembly comprises an outboard seal member preventing fluid flow between the outboard support member of the main track frame and the sprocket carrier.

8. A drive system for driving an associated sprocket of an associated tracked work vehicle, the drive system comprising:
a main track frame adapted to be coupled with the associated tracked vehicle, the main track frame comprising:
an inboard support member; and
an outboard support member, wherein the inboard and outboard support members are spaced apart relative to each other defining a gap therebetween;
a sprocket carrier spanning the gap and being carried rotatably relative to the inboard and outboard support members about a rotation axis X, the sprocket carrier being adapted to couple with the associated sprocket of the associated tracked work vehicle;

a gear assembly disposed in the gap, the gear assembly being operable to communicate rotational power from an associated input driving member to the sprocket carrier for driving the sprocket carrier relative to the main track frame;
an inboard bearing assembly comprising an inboard quill, the inboard bearing assembly being disposed in the sprocket carrier between the sprocket carrier and the inboard support member of the main track frame, the inboard bearing assembly rotatably coupling the sprocket carrier with the inboard support member of the main track frame, wherein the inboard quill is operative to set a nominal axial preload along the rotation axis X between the inboard and outboard bearing assemblies; and
an outboard bearing assembly comprising an outboard quill, the outboard bearing assembly being disposed in the sprocket carrier between the sprocket carrier and the outboard support member of the main track frame, the outboard bearing assembly rotatably coupling the sprocket carrier with the outboard support member of the main track frame, wherein the outboard quill is operative to set, together with the nominal axial preload, a final working axial preload along the rotation axis X between the inboard and outboard bearing assemblies.

9. The drive system according to claim 8, wherein:
the gear assembly comprises a planetary gear system comprising:
a sun gear operatively coupled with the associated input driving member;
a ring gear operatively coupled with the inboard support member of the main track frame;
a plurality of planetary gears in operative engagement with the sun and ring gears; and
a planetary gear carrier carrying the plurality of planetary gears relative to the sun and ring gears,
wherein the planetary gear carrier is operatively coupled with the sprocket carrier for driving the sprocket carrier relative to the main track frame responsive to the rotational power from the associated input driving member communicated to the sun gear.

10. The drive system according to claim 8, wherein:
the gear assembly is disposed in the sprocket carrier.

11. The drive system according to claim 8 wherein:
the sprocket carrier comprises a split carrier member comprising:
an inner sprocket support member rotatably carried by the inboard bearing assembly relative to the inboard support member; and
an outer sprocket support member rotatably carried by the outboard bearing assembly relative to the outboard support member.

12. The drive system according to claim 8, wherein:
the sprocket carrier is integrally formed with the associated sprocket of the associated tracked work vehicle.

13. The drive system according to claim 8, wherein:
the inboard bearing assembly comprises an inboard seal member preventing fluid flow between the inboard support member of the main track frame and the sprocket carrier; and
the outboard bearing assembly comprises an outboard seal member preventing fluid flow between the outboard support member of the main track frame and the sprocket carrier.

14. A unitized drive system for driving an associated sprocket of an associated tracked work vehicle, the unitized drive system comprising:
- a sprocket carrier;
- a planetary gear assembly;
- an inboard bearing assembly comprising an inboard quill;
- an outboard bearing assembly comprising an outboard quill; and
- a main track frame adapted to be coupled as an integrated assembly together with the sprocket carrier and the gear assembly with the associated tracked vehicle, the main track frame comprising:
  - an inboard support member; and
  - an outboard support member, wherein the inboard and outboard support members are spaced apart relative to each other defining a gap therebetween,
- wherein the sprocket carrier is disposed in the gap and is carried rotatably about an axis X by the inboard and outboard bearing assemblies relative to the inboard and outboard support members, the sprocket carrier being adapted to couple with the associated sprocket of the associated tracked work vehicle,
- wherein the planetary gear assembly is disposed in the sprocket carrier, the planetary gear assembly being operable to communicate rotational power from an associated input driving member to the sprocket carrier for driving the sprocket carrier relative to the main track frame,
- wherein the inboard quill is operative to set a nominal axial preload along the rotation axis X between the inboard and outboard bearing assemblies,
- wherein the outboard quill is operative to set, together with the nominal axial preload, a final working axial preload along the rotation axis X between the inboard and outboard bearing assemblies.

15. The drive system according to claim 14 wherein:
the planetary gear assembly comprises:
- a sun gear operatively coupled with the associated input driving member;
- a ring gear operatively coupled with the inboard support member of the main track frame;
- a plurality of planetary gears in operative engagement with the sun and ring gears; and
- a planetary gear carrier carrying the plurality of planetary gears relative to the sun and ring gears,
  wherein the planetary gear carrier is operatively coupled with the sprocket carrier for driving the sprocket carrier relative to the main track frame responsive to the rotational power from the associated input driving member communicated to the sun gear.

16. The drive system according to claim 15, wherein:
the inboard bearing assembly is disposed in the sprocket carrier between the inboard support member of the main track frame and the sprocket carrier;
the outboard bearing assembly is disposed in the sprocket carrier between the outboard support member of the main track frame and the sprocket carrier; and
the inboard and outboard bearing assemblies rotatably couple the sprocket carrier directly with the main track frame.

17. An apparatus configured to drive an associated sprocket relative to an associated main track frame of an associated work vehicle, the main track frame including inboard and outboard support members spaced apart relative to each other and defining a gap therebetween, the apparatus comprising:
- a sprocket carrier adapted to couple with the associated sprocket of the associated work vehicle;
- a first bearing assembly comprising a first quill;
- a second bearing assembly comprising a second quill, wherein the first and second bearing assemblies are configured to carry the sprocket carrier relative to the first and second support members in the gap rotatably about a rotation axis X; and
- a gear assembly in the sprocket carrier, the gear assembly being operable to communicate rotational power from an associated input driving member to the sprocket carrier for driving the sprocket carrier relative to the main track frame,
- wherein the first quill is operative to set a nominal axial preload along the rotation axis X between the first and second bearing assemblies,
- wherein the second quill is operative to set, together with the nominal axial preload, a final working axial preload along the rotation axis X between the first and second bearing assemblies.

18. The apparatus according to claim 17, wherein:
the gear assembly comprises a planetary gear assembly disposed in the sprocket carrier.

19. The apparatus according to claim 18, wherein the planetary gear assembly comprises:
- a sun gear operatively coupled with the associated input driving member;
- a ring gear operatively coupled with the inboard support member of the main track frame;
- a plurality of planetary gears in operative engagement with the sun and ring gears; and
- a planetary gear carrier carrying the plurality of planetary gears relative to the sun and ring gears,
  wherein the planetary gear carrier is operatively coupled with the sprocket carrier for driving the sprocket carrier relative to the main track frame responsive to the rotational power from the associated input driving member communicated to the sun gear.

20. The apparatus according to claim 17, wherein:
the sprocket carrier comprises a split carrier member comprising:
- a first sprocket support member rotatably carried by the first bearing assembly relative to the first support member; and
- a second sprocket support member rotatably carried by the second bearing assembly relative to the second support member.

21. The apparatus according to claim 17, wherein:
the sprocket carrier is integrally formed with the associated sprocket of the associated work vehicle.

* * * * *